United States Patent
Alpert et al.

(10) Patent No.: US 9,946,824 B2
(45) Date of Patent: Apr. 17, 2018

(54) EFFICIENT $C_{eff}$ MODEL FOR GATE OUTPUT SLEW COMPUTATION IN EARLY SYNTHESIS

(71) Applicant: International Business Machines Corporation, Armonk, NY (US)

(72) Inventors: Charles J. Alpert, Austin, TX (US); Zhuo Li, Cedar Park, TX (US); Sani R. Nassif, Austin, TX (US); Yilin Zhang, Austin, TX (US); Ying Zhou, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 14/086,610

(22) Filed: Nov. 21, 2013

(65) Prior Publication Data
US 2015/0143326 A1    May 21, 2015

(51) Int. Cl.
G06F 17/50       (2006.01)

(52) U.S. Cl.
CPC ...... *G06F 17/5036* (2013.01); *G06F 2217/84* (2013.01)

(58) Field of Classification Search
USPC .......................................... 716/104
See application file for complete search history.

(56) References Cited

U.S. PATENT DOCUMENTS

| 6,314,546 B1* | 11/2001 | Muddu | G06F 17/5022 716/113 |
| 6,347,393 B1* | 2/2002 | Alpert | G06F 17/505 716/114 |
| 8,145,442 B2 | 3/2012 | Li et al. | |

OTHER PUBLICATIONS

Zhou, Ying; Li, Zhuo; Kanj, Rouwaida N.; Papa, David A.; Nassif, Sani; Shi, Weiping; "A More Effective Ceff for Slew Estimation," IEEE, 2007.*

Kahng, Andrew B., et al., "New Efficient Algorithms for Computing Effective Capacitance", Proc. Intl. Symposium on Physical Design (1998).

Mok, Santiago, "Propagation Delay Approximation considering Effective Capacitance and Slew Degradation", UCLA.

(Continued)

*Primary Examiner* — Eric Lee
(74) *Attorney, Agent, or Firm* — Mercedes L. Hobson; Jack V. Musgrove (57) ABSTRACT

A slew-based effective capacitance ($C_{eff}$) is used to compute gate output slew during early synthesis of an integrated circuit design. A π model is constructed for the gate and reduced to two parameters which are used to compute a slew value for the model, given a slew definition. A capacitance coefficient is then calculated as a function of this slew value. The effective capacitance is the product of the coefficient and the total capacitance of the π model. The output slew of the gate may in turn be computed using the slew-based $C_{eff}$. The coefficient may be computed by iteratively solving an equation representing output voltage over time dependent on the first and second parameters, by directly solving a closed-form equation which is a function of the first and second parameters, or by looking up the capacitance coefficient in a table indexed by the first and second parameters.

7 Claims, 4 Drawing Sheets

(56) References Cited

OTHER PUBLICATIONS

O'Brien, et al., "Modeling the Driving-Point Characteristic of Resistive Interconnect for Accurate Delay Estimation", Int'l Conf. Computer Aided Design, pp. 512-515 (1989).
Qian, Jessica, et al., "Modeling the effective capacitance for the RC interconnect of CMOS gates," IEEE Transactions on Computer-Aided Design, v. 13, pp. 1526-1535 (1994).
Sheehan, Bernard N., "Library Compatible Ceff for Gate-Level Timing", IEEE Computer Society, pp. 826-830 (2002).
Zhou, Ying, et al., "A More Effective Ceff for Slew Estimation," Intl. Conf. IC Design and Technology (2007).

\* cited by examiner

EFFICIENT $C_{eff}$ MODEL FOR GATE OUTPUT SLEW COMPUTATION IN EARLY SYNTHESIS

BACKGROUND OF THE INVENTION

Field of the Invention

The present invention generally relates to the design of integrated circuits, and more particularly to a method of computing an output slew of a gate or cell in an integrated circuit design.

Description of the Related Art

Integrated circuits are used for a wide variety of electronic applications, from simple devices such as wristwatches, to the most complex computer systems. A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements combined to perform a logic function. Cell types include, for example, core cells, scan cells, input/output (I/O) cells, and memory (storage) cells. Each of the cells of an IC may have one or more pins, each of which in turn may be connected to one or more other pins of the IC by wires. The wires connecting the pins of the IC are also formed on the surface of the chip. For more complex designs, there are typically at least four distinct layers of conducting media available for routing, such as a polysilicon layer and three metal layers (metal-1, metal-2, and metal-3). The polysilicon layer, metal-1, metal-2, and metal-3 are all used for vertical and/or horizontal routing.

An IC chip is fabricated by first conceiving the logical circuit description, and then converting that logical description into a physical description, or geometric layout. This process is usually carried out using a "netlist," which is a record of all of the nets, or interconnections, between the cell pins, including information about the various components such as transistors, resistors and capacitors. A layout typically consists of a set of planar geometric shapes in several layers. The layout is then checked to ensure that it meets all of the design requirements, particularly timing requirements. The result is a set of design files known as an intermediate form that describes the layout. The design files are then run through a dataprep process that is used to produce patterns called masks by an optical or electron beam pattern generator. During fabrication, these masks are used to etch or deposit features in a silicon wafer in a sequence of photolithographic steps using a complex lens system that shrinks the mask image. The process of converting the specifications of an electrical circuit into such a layout is called the physical design.

Cell placement in semiconductor fabrication involves a determination of where particular cells should optimally (or near-optimally) be located on the surface of a integrated circuit device. Due to the large number of components and the details required by the fabrication process for very large scale integrated (VLSI) devices, physical design is not practical without the aid of computers. As a result, most phases of physical design extensively use computer-aided design (CAD) tools, and many phases have already been partially or fully automated. Automation of the physical design process has increased the level of integration, reduced turn around time and enhanced chip performance. Several different programming languages have been created for electronic design automation (EDA), including Verilog, VHDL and TDML. A typical EDA system receives one or more high level behavioral descriptions of an IC device, and translates this high level design language description into netlists of various levels of abstraction.

Physical synthesis is prominent in the automated design of integrated circuits such as high performance processors and application specific integrated circuits (ASICs). Physical synthesis is the process of concurrently optimizing placement, timing, power consumption, crosstalk effects and the like in an integrated circuit design. This comprehensive approach helps to eliminate iterations between circuit analysis and place-and-route. Physical synthesis has the ability to repower gates (changing their sizes), insert repeaters (buffers or inverters), clone gates or other combinational logic, etc., so the area of logic in the design remains fluid. However, physical synthesis can take days to complete, and the computational requirements are increasing as designs are ever larger and more gates need to be placed. There are also more chances for bad placements due to limited area resources.

Faster performance and predictability of responses are elements of interest in circuit designs. As process technology scales to the deep and ultra-deep submicron regime, circuit timing is becoming increasingly important to the performance and reliability of IC chips and systems. Consequently, methods continue to be devised to more precisely estimate timing parameters such as delay and signal slew. One prominent approach is static timing analysis (STA). The accuracy of STA is determined by the accuracy of the waveform and timing models used for logic cells and interconnect wires, so a significant research effort has been made to assess and improve this accuracy. Existing STA methodologies translate the actual loading interconnect parasitics into a single effective capacitance. This effective capacitance can then be used to compute an estimated delay for a gate or cell. Different delay models can be used at different levels of the synthesis. Typically a simpler model is used in the early stages (touching millions of gates/nets, optimized with hundreds of iterations), and a more complex model is used for post-routing and final sign-off. There is accordingly a tradeoff between runtime (expense) and accuracy. One popular interconnect delay model for early synthesis is the Elmore delay which is based on an RC-tree network. An RC (resistor-capacitor) network has been widely used in electronic circuit design automation for modeling the driving gate and interconnect circuits. The RC network models the circuit with capacitors from all nodes to ground, no capacitors connected between non-ground nodes, and no resistors connected to ground. In general, the Elmore value is computed by traversing the RC-tree and summing all resistors along the shortest path to the output node; each resistor sum is then multiplied by the grounded capacitor in the subset path. For gate delay and slew model, one generally looks up two 2D tables where input slew and output load are the indexes to search, using one table for delay and one table for slew.

The synthesis process relies on detailed circuit simulation and is therefore very expensive. The number of simulations (using a simulator such as SPICE) grows rapidly with the number of inputs, explaining the desire to simplify the load model to a single variable (lumped or effective capacitance). Previous work on effective capacitance ($C_{eff}$) computes a capacitance coefficient based on matching the delay of the $C_{\mathit{eff}}$ curve and a π model curve. The π model is derived based on the state-of-art approach (see "Modeling the driving-point characteristic of resistive interconnect for accurate delay estimation", O'Brien et al., ICCAD 1989, pp. 512-515) by traversing the linear RC interconnect, computing the first 3 moments of this network, and mapping the final 3 moments to a near capacitor $C_1$, a resistor $R_1$ and a far capacitor $C_2$. In a π model, the driving gate or cell and the output interconnect are modeled as two resistors connected in series, with a first capacitor connected to ground and a node between the two resistors, and a second capacitor connected to ground and the output node of the second resistor. The capacitance coefficient is selected to derive a $C_{\mathit{eff}}$ which matches the point at which the π model signal is one-half its active voltage (50% delay).

Figure 1:
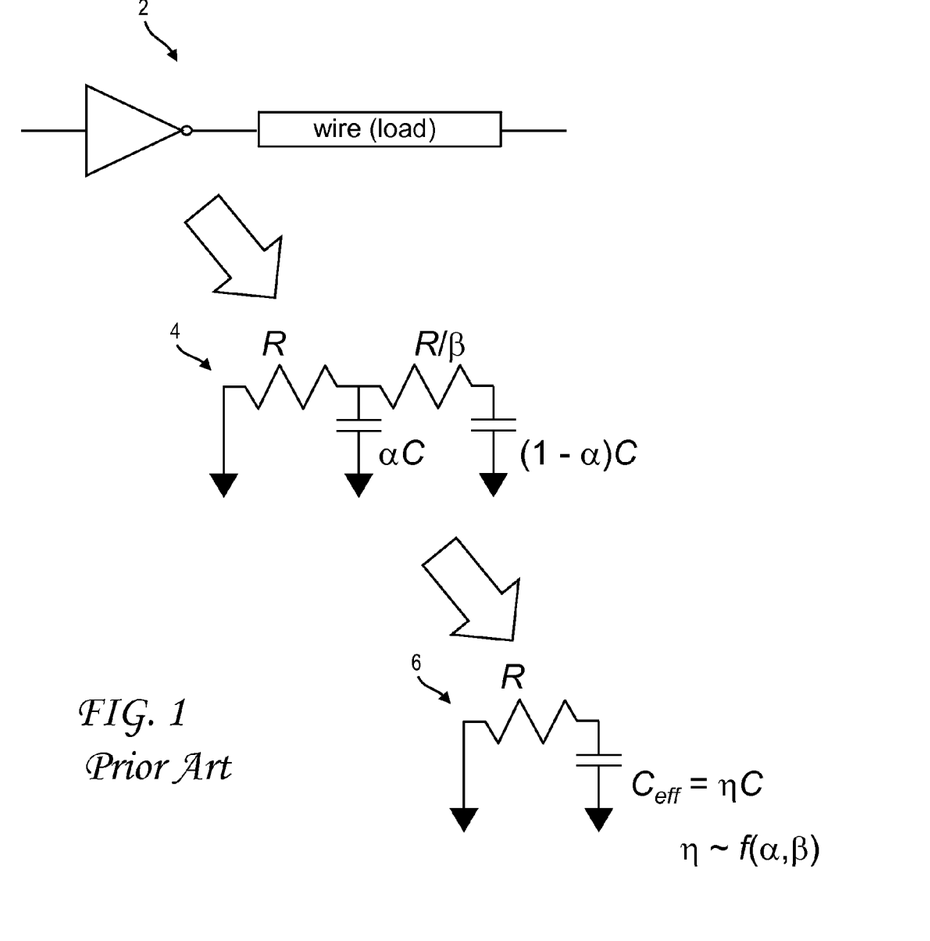
FIG. 1 is a pictorial representation of a conventional technique which reduces a gate and output interconnect into different circuit models to derive an effective capacitance for estimating output slew of the gate.

This delay-based $C_{\mathit{eff}}$ can be used for computing both delay and slew. While this approach is very efficient for estimating gate delay, it does not perform well for estimating gate output slew. Slew (or slew rate) refers to the rise time or fall time of a switching digital signal. Different definitions can be used to quantify slew, the most common being the 10/90 slew which is the time it takes for a rising waveform to cross from the 10% signal level to the 90% signal level (or from 90% to 10% for a falling waveform). Other definitions such as 20/80 slew or 30/70 slew are often used when the waveform has a slowly rising or falling tail. The slew is altered by the capacitance and resistance of the interconnecting nets as well as the gain of the transistors within a cell. In conventional synthesis the gate output slew computation is carried out using a library lookup table based on a given input slew and load, i.e., capacitance. However, studies show that using a delay-based $C_{\mathit{eff}}$ to compute gate output slew can result in huge errors. Attempts have accordingly been made to craft a $C_{\mathit{eff}}$ that is more accurate for slew estimation. FIG. 1 illustrates one technique described in the paper by Zhou et al, "A More Effective $C_{\mathit{eff}}$ for Slew Estimation", Intl. Conf. IC Design and Technology (2007). The gate/interconnect 2 is transformed to a π model 4 via model order reduction. The π model is parameterized using two parameters α and β where the capacitance of the first capacitor is characterized by a total capacitance C multiplied by α, the capacitance of the second capacitor is characterized by the total capacitance C multiplied by the difference of one minus α, the resistance of the first resistor is characterized as the total resistance R, and the resistance of the second resistor is characterized as the total resistance R divided by β. These two parameters α and β are used to derive a capacitance coefficient η, and the gate/interconnect is further reduced to a simple model 6 having a single resistor and a single capacitor, with the effective capacitance being the product of this coefficient η and the total capacitance C. The voltage curve is solved twice (for each point of the slew definition, e.g., at the 10% voltage point and the 90% voltage point), and the difference between these two voltages is then used to compute the slew.

SUMMARY OF THE INVENTION

The present invention is generally directed to a method of determining the effective capacitance of a gate in an integrated circuit design by constructing a π model for the gate which includes an output resistance and a total capacitance, reducing the π model to first and second parameters based on the output resistance and the total capacitance, providing a slew definition which includes a first voltage level and a second voltage level, computing a capacitance coefficient as a function of a slew value of the π model for the slew definition based on the first and second parameters, and calculating the effective capacitance of the gate as the product of the capacitance coefficient and the total capacitance. The output slew of the gate can then be computed using the effective capacitance. The capacitance coefficient may be computed by iteratively solving an equation representing output voltage of the gate over time dependent on both the first and second parameters, by directly solving a closed-form equation which is a function of both the first and second parameters, or by looking up the capacitance coefficient in a table indexed by both the first and second parameters. In the exemplary implementation, the π model includes first and second resistors and first and second capacitors, the first resistor being connected to a first node of the second resistor, the first capacitor being connected between the first node and electrical ground, and the second capacitor being connected between a second node of the second resistor and electrical ground; a first capacitance of the first capacitor is characterized by the total capacitance multiplied by the first parameter, a second capacitance of the second capacitor is characterized by the total capacitance multiplied by the difference of one minus the first parameter, a first resistance of the first resistor is characterized as the output resistance, and a second resistance of the second resistor is characterized as the output resistance divided by the second parameter; and an index of the table for the second parameter includes a nonlinear region and a linear region, the nonlinear region using smaller steps than the linear region, and the nonlinear region being at a lower range of the second parameter.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

DESCRIPTION OF THE PREFERRED EMBODIMENT(S)

As described above, prior work on $C_{eff}$ focuses on computing a capacitance coefficient by matching the delay of the $C_{eff}$ curve and π model curve at a specific point (50% delay), but this delay-based $C_{eff}$ is unreliable for slew computations even in early synthesis flow. An ideal $C_{eff}$ for slew matching might be as much as 60% larger than total lumped capacitance, and previous models always generated a value less than total lumped capacitance. There are more accurate techniques that compute the full waveform of the signal, but these techniques are too computationally intensive (i.e., expensive) to use in the early synthesis stage.

It would, therefore, be desirable to devise an improved method of deriving an effective capacitance for gate output slew computations. It would be further advantageous if the method could result in a single $C_{eff}$ value (for a given slew definition) which can then be used to directly calculate output slew. These advantages are achieved in the present invention which uses a new $C_{eff}$ model based on slew instead of delay. With a series of formulas, the circuit design can build the new model based on an iterative solver, or by using a 2D table or one of several closed-form equations. This new model can then be employed during the synthesis to find the gate output slew on the fly.

Figure 2:
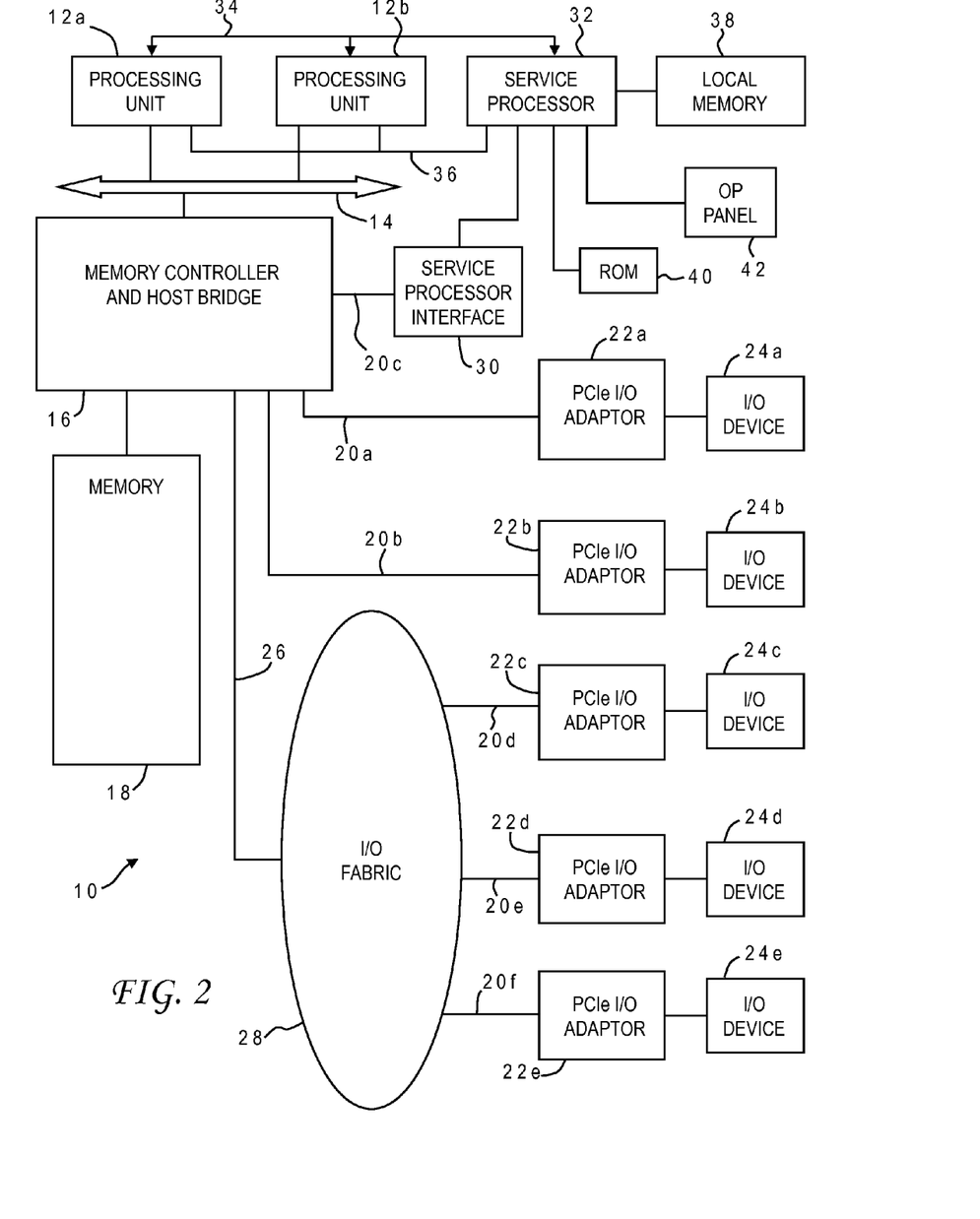
FIG. 2 is a block diagram of a computer system programmed to carry out integrated circuit design in accordance with one implementation of the present invention.

With reference now to the figures, and in particular with reference to FIG. 2, there is depicted one embodiment 10 of a computer system in which the present invention may be implemented to carry out the design of logic structures in an integrated circuit, including computations relating to gate output slew. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the circuit design application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, written for a variety of platforms such as an AIX environment or operating systems such as Windows 7 or Linux. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such computer-readable storage media excludes transitory media such as propagating signals.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 10 executes program instructions for a physical synthesis process to carry out the design of semiconductor devices, i.e., integrated circuits, using a novel slew computation technique. Accordingly, a program embodying the invention may include conventional aspects of various synthesis and design tools, and these details will become apparent to those skilled in the art upon reference to this disclosure.

Figure 3:
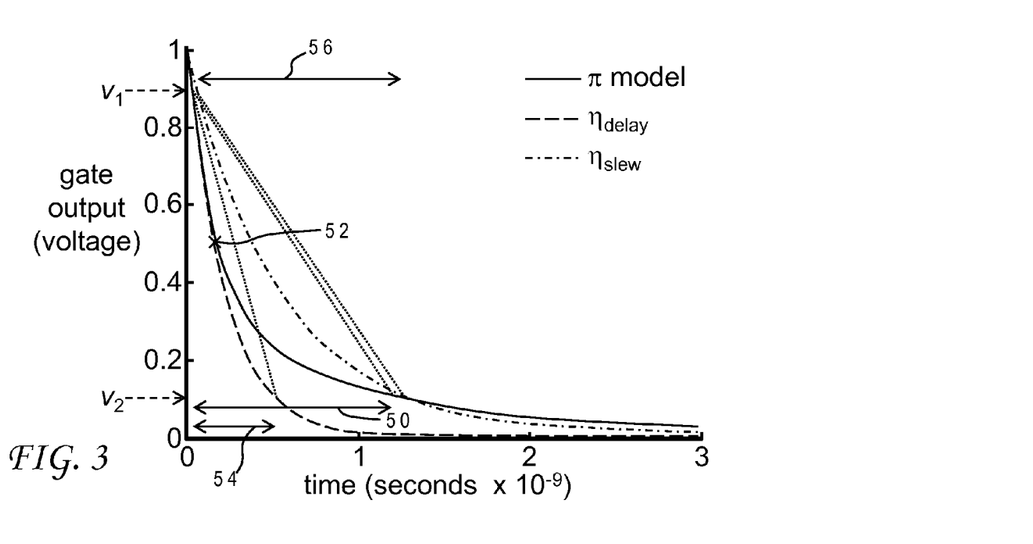
FIG. 3 is a graph of a voltage curve for a π model representation of a gate output, illustrating for comparison a voltage curve for a delay-based (50% point) effective capacitance, and further illustrating how a voltage curve for a slew-based effective capacitance is matched to the π model in accordance with one implementation of the present invention.

Referring now to FIG. 3, there is depicted a graph illustrating a signal (voltage curve) for an output of a gate or cell of an integrated circuit design according to a π model for the gate using a conventional slew simulation. The gate may be any logic cell or combinational gate, such as an AND gate. The π model curve is shown as a solid line. In this example, the nominal voltage is one volt and the signal is falling, but those skilled in the art will understand that the principles of the present invention apply to any supply voltage and to a rising signal. Further to this example, the slew definition employed for timing analysis is 90/10, i.e., the time it takes for the signal to fall from a 90% voltage level ($v_1$=0.9) to a 10% voltage level ($v_2$=0.1), but those skilled in the art will again appreciate that the present invention is applicable to any slew definition. Using this definition, the slew for the π model curve is indicated by double-headed arrow 50, i.e., the time it takes for the curve to fall from $v_1$ to $v_2$, which in this case is about $1.15 \times 10^{-9}$ seconds. FIG. 3 also shows an output signal for the gate which is derived using a delay-based capacitance coefficient $\eta_{delay}$ according to a conventional approach ($C_{eff}=\eta_{delay}C$) as a dashed line. In the conventional approach, the signal is matched at the 50% point 52 for delay computations. The slew for this $\eta_{delay}$ curve is indicated by double-headed arrow 54 which in this case is about $0.48 \times 10^{-9}$ seconds, a huge discrepancy from the π model slew.

FIG. 3 additionally shows an output signal for the gate which is derived using a novel slew-based capacitance coefficient $\eta_{slew}$ according to one implementation of the present invention as a dash-dot line. As explained in further detail below, the present invention allows the designer to match an effective capacitance, for slew computation purposes, to the slew of the π model. This resulting $\eta_{slew}$ curve is no better than the $\eta_{delay}$ curve in terms of matching the entire π model curve, but the goal is not to match the whole curve, just the slew of the π model. The slew for the $\eta_{slew}$ curve is indicated by double-headed arrow 56 which in this case is about 1.18×10⁻⁹ seconds, not exactly the same as the π model slew, but vastly superior to the slew estimate using the delay-based capacitance coefficient $\eta_{delay}$, and certainly close enough for purposes of slew computation and static timing analysis in early stages of synthesis. The delay-based effective capacitance is reliable for delay estimation since it matches the 50% point of the π model, so the old coefficient $\eta_{delay}$ can still be used for the gate delay computations, but the new coefficient $\eta_{slew}$ is used for gate output slew.

Figure 4:
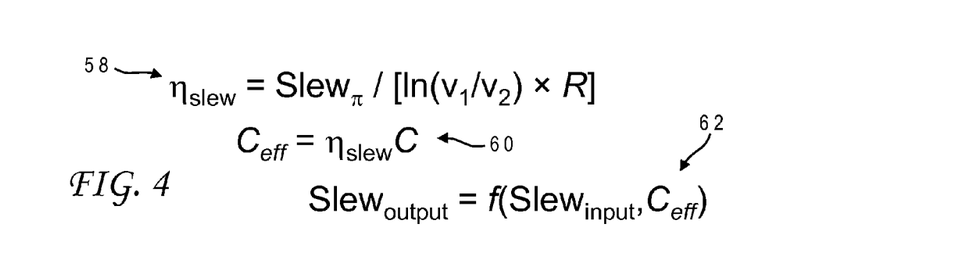
FIG. 4 is a set of equations representing a slew-based capacitance coefficient and an effective capacitance which is used to compute a gate output slew in accordance with one implementation of the present invention.

The slew-based capacitance coefficient $\eta_{slew}$ of the present invention can be calculated in a variety of methods, but generally is a function of the slew definition and the slew from the particular circuit model used which advantageously can be the π model. In the exemplary implementation $\eta_{slew}$ is proportional to the π model slew and inversely proportional to a logarithm of the ratio of the two voltage levels from the slew definition. FIG. 4 illustrates several equations relating to the $C_{eff}$ model for gate output slew computations according to the preferred embodiment. As seen in equation 58, $\eta_{slew}$ can be set equal to the π model slew divided by the product of the gate output resistance R and the natural log of the voltage ratio. So for example, for a falling signal 90/10 definition, $\eta_{slew}$ would correspond to the π model slew divided by the product of the total resistance and ln 9 (0.9/0.1=9), while for an 80/20 definition the logarithm component would be ln 4 (0.8/0.2=4). For a rising signal, the numerator in the logarithm component is still the higher voltage level.

The gate output resistance R can be derived by any means including curve fitting or closed-form equations. In curve fitting, for any standard cell and a given input slew, a set of load values is chosen and the output slew is computed. Linear regression can then be used to find the slope of the resulting curve, which is R. The closed-form equations may be for a simple MOSFET model. First, a closed-form expression can be found for a slew T with a single capacitance load C, and R is then computed as T/C.

The π model slew can also be provided by various means. In particular, an iterative solution may be used to compute $\eta_{slew}$ on the fly. The π model is again parameterized (α and β) relative to the output resistance R and the total capacitance C as in the state-of-art approach ("Modeling the driving-point characteristic of resistive interconnect for accurate delay estimation", O'Brien et al., ICCAD 1989, pp. 512-515) by traversing the linear RC interconnect, computing the first 3 moments of this network, and mapping the final 3 moments to a near capacitor $C_1$, a resistor $R_1$ and a far capacitor $C_2$. The following equation for output voltage can then be set to 10% and 90% $V_{dd}$ (or any other percentages for the given slew definition) and iteratively solved for t to yield the times $t_1$, $t_2$ at which the signal passes these marks:

$$v = e^{-t/\tau_1}\left[-\frac{1-\alpha-\beta}{\xi}\sinh\left(\frac{t}{\tau_2}\right) + \cosh\left(\frac{t}{\tau_2}\right)\right]$$

-continued where $\tau_1 = \dfrac{2\alpha(1-\alpha)}{1-\alpha+\beta}\tau$, $\tau_2 = \dfrac{2\alpha(1-\alpha)}{\xi}\tau$, $\tau = RC$, $\xi = \sqrt{(1-\alpha+\beta)^2 - 4\alpha\beta(1-\alpha)}$.

The difference of these two times $t_1$, $t_2$ is the slew value for the π model.

Figure 5:
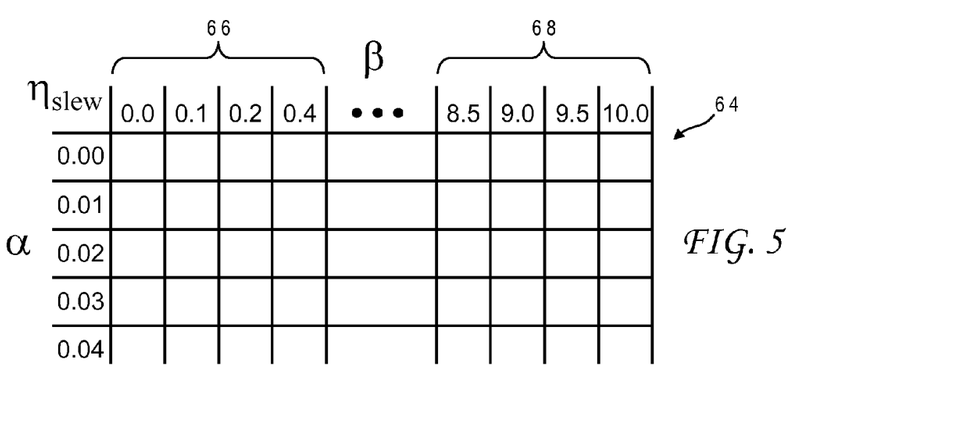
FIG. 5 is a 2D table for looking up the slew-based capacitance coefficient wherein the scale (steps) for the β parameter include a linear portion and a non-linear portion in accordance with one implementation of the present invention.

With further reference to FIG. 5, while the foregoing computations (the iterative solutions and equation 58) may be made in real-time by computer 10 during synthesis, the invention may alternatively rely on a 2D lookup table 64 stored in memory which has precomputed values for $\eta_{slew}$ based on the foregoing output voltage equation indexed by α and β. It has been observed that the response of $\eta_{slew}$ to β can be highly non-linear for very low values of β, particularly in the range of 0 to 2. Table 54 can accordingly use a linear scale for α, but provide a non-linear (perhaps logarithmic) region 66 for β where a smaller step is used (between 0 to 2) with a linear region 68 for higher values of β. In general, one CAD tool may use one slew definition, and in this case one table is sufficient. However, multiple tables can be provided for each definition if a chip may use multiple definitions.

As a further alternative to the iterative solution or lookup table, the present invention may instead rely on any of a number of closed-form equations (fitting functions) embodying equation 58 which are dependent only on α and β. One such closed-form equation which has been found suitable is:

$\eta_{slew}$=1+48.2415(1−α)$^{(1-0.0001\beta)}e^{2.3913/(0.3280+\beta^{-1.2603})}$−48.1249(1−α)$e^{2.3933/(0.3282+\beta^{-1.2604})}$.

Another suitable equation is:

$\eta_{slew}$=2−(1.71α+β²)/(1.71+β²)−(0.061−0.061α)/(0.030+β).

These equations allow computer system 10 to directly compute $\eta_{slew}$ from only α and β. Closed-form equations may be particularly useful for statistical STA where device variations can be taken into account.

Returning to FIG. 4, once $\eta_{slew}$ is found (via iterative solution, table lookup, or closed-form equation), the effective capacitance can be calculated as the product of $\eta_{slew}$ and the total capacitance C as seen in equation 60. The total capacitance is known from the π model for the gate, basically $C_{near}+C_{far}$ (see the ICCAD 1989 paper). The total capacitance C of the π model matches total capacitance of the original RC interconnect by adding all ground capacitances of interconnect segments and the pin load of sinks. The output slew of the gate is then computed as seen in equation 62 as a function of the input slew and $C_{eff}$ according to conventional means such as a library lookup table.

Figure 6:
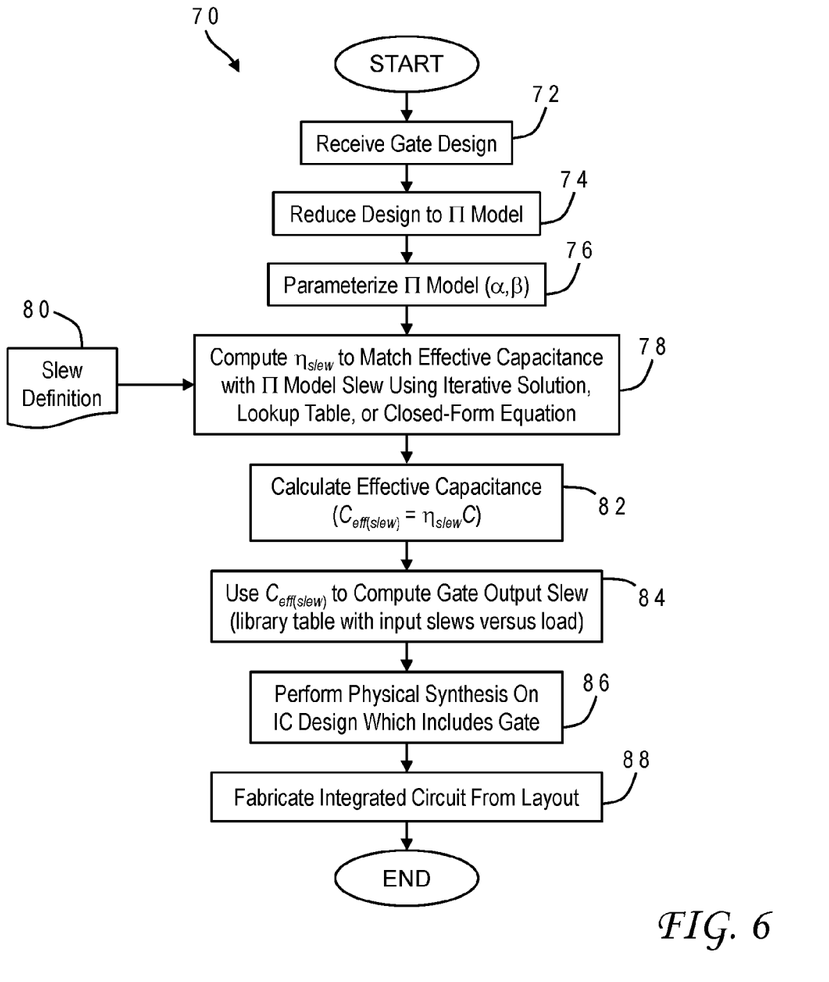
FIG. 6 is a chart illustrating the logical flow for a gate output slew computation process in accordance with one implementation of the present invention.

The invention may be further understood with reference to the chart of FIG. 6 which illustrates the logical flow for a gate output slew computation process 70 in accordance with one implementation. The process begins when computer system 10 receives the information pertaining to the design of the subject gate (72). This information may include the gate netlist and the RC network of the interconnect. The gate design can be reduced down to a π model (74), and parameterized to yield the α and β values (76). The slew-based capacitance coefficient is computed (78), for the given slew definition (80), and the effective capacitance for the slew computation is calculated using the slew-based capacitance coefficient (82). A conventional library table is then used to correlate the effective capacitance (and input slew) with the final gate output slew (84). This output slew may actually be used as an input slew for a different (downstream) gate which can undergo the same process 70, i.e., slew propagation. This entire gate output slew computation process can be part of a larger physical synthesis procedure (86). As noted above, as part of that synthesis procedure a delay may be computed for the same gate using a delay-based effective capacitance which is different from the slew-based effective capacitance of the present invention. The integrated circuit is then fabricated from the circuit layout generated by the physical synthesis process (88).

The present invention thereby provides an improved $C_{eff}$ model for gate output slew computations in early synthesis. The new slew-based $C_{eff}$ model affords a significant increase in the accuracy of the gate output slew computation, without significantly increasing expense. It is more efficient than the approach previously described in the paper by Zhou et al. inasmuch as that approach does not provide a single formula to derive $C_{eff}$. Rather, that approach first finds one $C_{eff}$ for a first voltage level according to the definition (e.g., 10% point) and then finds a second $C_{eff}$ for the second voltage level (e.g., 90% point). Thereafter, the difference for these two voltages is used to obtain the slew. In contrast, the present invention allows for a single $C_{eff}$ to directly match the slew. In addition, the paper by Zhou et al. has inaccurate formulas when $\beta$ is small where it assumes $\eta$ is always greater than 1, whereas the present invention identifies that when $\beta$ is very small, $\eta$ is very close to the value of $\alpha$ and could be less than 1 in that region.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of making an integrated circuit having a gate comprising:
    constructing a $\pi$ model for the gate which includes an output resistance and a total capacitance, by executing first program instructions in a computer system;
    reducing the $\pi$ model to first and second parameters based on the output resistance and the total capacitance, by executing second program instructions in the computer system;
    providing a slew definition which includes a first voltage level and a second voltage level, by executing third program instructions in the computer system;
    computing a capacitance coefficient as a function of a slew value of the $\pi$ model for the slew definition based on the first and second parameters, by executing fourth program instructions in the computer system;
    calculating the effective capacitance of the gate as the product of the capacitance coefficient and the total capacitance, by executing fifth program instructions in the computer system;
    performing physical synthesis on an integrated circuit design which includes the gate using the effective capacitance of the gate to generate a layout for the integrated circuit; and
    fabricating the integrated circuit from the layout.

2. The method of claim 1, further comprising computing an output slew of the gate using the effective capacitance.

3. The method of claim 1 wherein the capacitance coefficient $\eta_{slew}$ is computed according to the equation $$\eta_{slew} = Slew_\pi / [R \times \ln(v_1/v_2)]$$

where $Slew_\pi$ is the slew value of the $\pi$ model, R is the output resistance, $v_1$ is the first voltage level, and $v_2$ is the second voltage level.

4. The method of claim 1 wherein said computing includes iteratively solving, for each of the first and second voltage levels, an equation representing output voltage of the gate over time to derive the slew value, the equation being dependent on both the first and second parameters.

5. The method of claim 1 wherein said computing includes solving a closed-form equation to directly yield the capacitance coefficient, the closed-form equation being a function of both the first and second parameters.

6. The method of claim 1 wherein said computing includes looking up the capacitance coefficient in a table indexed by both the first and second parameters.

7. The method of claim 6 wherein:
    the $\pi$ model includes first and second resistors and first and second capacitors, the first resistor being connected to a first node of the second resistor, the first capacitor being connected between the first node and electrical ground, and the second capacitor being connected between a second node of the second resistor and electrical ground;
    a first capacitance of the first capacitor is characterized by the total capacitance multiplied by the first parameter, a second capacitance of the second capacitor is characterized by the total capacitance multiplied by the difference of one minus the first parameter, a first resistance of the first resistor is characterized as the output resistance, and a second resistance of the second resistor is characterized as the output resistance divided by the second parameter; and
    an index of the table for the second parameter includes a nonlinear region and a linear region, the nonlinear region using smaller steps than the linear region, and the nonlinear region being at a lower range of the second parameter.

* * * * *